US011237695B2

(12) United States Patent
Asnis

(10) Patent No.: US 11,237,695 B2
(45) Date of Patent: Feb. 1, 2022

(54) EPG MENU WITH A PROJECTED 3D IMAGE

(71) Applicant: SLING MEDIA INC., Foster City, CA (US)

(72) Inventor: Ilya Asnis, San Jose, CA (US)

(73) Assignee: SLING MEDIA L.L.C., Foster City, CA (US)

( * ) Notice: Subject to any disclaimer, the term of this patent is extended or adjusted under 35 U.S.C. 154(b) by 128 days.

(21) Appl. No.: 14/053,843

(22) Filed: Oct. 15, 2013

(65) Prior Publication Data

US 2014/0108930 A1    Apr. 17, 2014

Related U.S. Application Data

(60) Provisional application No. 61/713,065, filed on Oct. 12, 2012.

(51) Int. Cl.
| | |
|---|---|
| *G06F 3/0481* | (2013.01) |
| *H04N 21/81* | (2011.01) |
| *G06F 3/0482* | (2013.01) |
| *H04N 21/482* | (2011.01) |
| *H04N 13/356* | (2018.01) |
| *H04N 13/398* | (2018.01) |

(52) U.S. Cl.
CPC ........ *G06F 3/04815* (2013.01); *G06F 3/0482* (2013.01); *H04N 13/356* (2018.05); *H04N 13/398* (2018.05); *H04N 21/482* (2013.01); *H04N 21/816* (2013.01)

(58) Field of Classification Search
CPC .... G06F 3/0481; G06F 3/0482; G06F 3/0483; G06F 3/04815; H04N 5/44543; H04N 21/4622; H04N 21/816; H04N 21/482; H04N 13/356; H04N 13/398; G11B 27/34; G11B 27/034
USPC ........................................ 715/716, 810, 764
See application file for complete search history.

(56) References Cited

U.S. PATENT DOCUMENTS

| | | | | |
|---|---|---|---|---|
| 5,187,808 | A * | 2/1993 | Thompson | H04W 24/00 455/518 |
| 5,485,197 | A * | 1/1996 | Hoarty | G06F 3/04815 345/649 |
| 5,664,128 | A * | 9/1997 | Bauer | G06F 3/0483 715/708 |
| 6,260,192 | B1 * | 7/2001 | Rosin | H04N 5/44543 348/E5.002 |
| 6,483,533 | B1 * | 11/2002 | Hall et al. | 348/40 |
| 6,836,274 | B1 * | 12/2004 | Kikinis | G06F 3/04815 345/679 |
| 6,857,128 | B1 * | 2/2005 | Borden, IV | G06F 3/0485 348/E5.105 |
| 7,233,316 | B2 * | 6/2007 | Smith et al. | 345/157 |

(Continued)

*Primary Examiner* — Adam M Queler
*Assistant Examiner* — Erik V Stitt
(74) *Attorney, Agent, or Firm* — Lorenz & Kopf, LLP

(57) ABSTRACT

A three-dimensional graphical user interface system comprises a media component configured to produce a signal comprising media content (e.g., a movie or television show being viewed by a user) and a three-dimensional graphical user interface (e.g., an interactive program guide). A display device communicatively coupled to the media component is configured to simultaneously display the three-dimensional graphical user interface and a media content image corresponding to the media content.

15 Claims, 5 Drawing Sheets

(56) References Cited

U.S. PATENT DOCUMENTS

| | | | | |
|---|---|---|---|---|
| 7,312,796 B1* | 12/2007 | Kikinis | | H04N 21/4312 345/420 |
| 7,685,619 B1* | 3/2010 | Herz | | H04N 5/44543 715/719 |
| 7,917,868 B2* | 3/2011 | Ok | | G06F 3/04815 345/419 |
| 7,986,324 B2* | 7/2011 | Funaki | | G06F 3/04815 345/440 |
| 8,120,605 B2* | 2/2012 | Lee | | H04N 5/45 345/419 |
| 8,132,049 B2* | 3/2012 | Yasukawa | | G06F 11/0733 714/26 |
| 8,291,322 B2* | 10/2012 | Klappert | | G06F 3/0346 715/721 |
| 8,443,300 B2* | 5/2013 | Nankani | | G06F 3/04815 715/836 |
| 8,631,351 B2* | 1/2014 | Fong | | G06F 3/048 715/834 |
| 9,030,522 B2* | 5/2015 | Hines | | H04L 65/4076 348/14.07 |
| 9,046,685 B2* | 6/2015 | Nakada | | G02B 27/017 |
| 9,081,476 B2* | 7/2015 | Kamen | | G06F 3/04815 |
| 2002/0100484 A1* | 8/2002 | Hall et al. | | 128/898 |
| 2002/0126121 A1* | 9/2002 | Robbins | | G06T 11/206 345/440 |
| 2003/0084445 A1* | 5/2003 | Pilat | | H04N 21/482 725/44 |
| 2004/0103432 A1* | 5/2004 | Barrett | | 725/39 |
| 2005/0091596 A1* | 4/2005 | Anthony | | G06F 3/04815 715/712 |
| 2006/0061651 A1* | 3/2006 | Tetterington | | 348/51 |
| 2006/0133633 A1* | 6/2006 | Hyvonen | | H04R 25/558 381/315 |
| 2007/0199021 A1* | 8/2007 | Kim | | H04N 5/44543 725/39 |
| 2009/0089834 A1* | 4/2009 | Parker | | H04N 21/4314 725/39 |
| 2009/0098827 A1* | 4/2009 | Koyama | | H01Q 1/243 455/41.2 |
| 2009/0150943 A1* | 6/2009 | Vasudevan | | H04N 21/2385 725/86 |
| 2009/0165048 A1* | 6/2009 | Nishimura | | H04N 5/44543 725/39 |
| 2009/0172557 A1* | 7/2009 | Muta | | G06F 3/1423 715/740 |
| 2011/0063287 A1* | 3/2011 | McNeill | | G06F 3/011 345/419 |
| 2011/0273534 A1* | 11/2011 | Luthra | | H04N 13/183 348/43 |
| 2011/0298803 A1* | 12/2011 | King | | A63F 13/25 345/427 |
| 2012/0069243 A1* | 3/2012 | Beemster | | H04N 9/3141 348/521 |
| 2014/0232539 A1* | 8/2014 | Hiruta | | G07C 5/08 340/438 |
| 2015/0042568 A1* | 2/2015 | Krah | | G01B 11/00 345/168 |

* cited by examiner

EPG MENU WITH A PROJECTED 3D IMAGE

CROSS-REFERENCE TO RELATED APPLICATIONS

This application claims priority to U.S. Provisional Patent Application No. 61/713,065, filed Oct. 12, 2012, the entire contents of which are incorporated by reference herein.

TECHNICAL FIELD

The present disclosure generally relates to systems and techniques for processing, viewing, and selecting media content within a home entertainment system. More particularly, the present disclosure relates to graphical user interfaces for viewing media content on three-dimensional display systems.

BACKGROUND

Three-dimensional (3D) display systems are increasingly used for viewing media in the context of home televisions, tablet computers, smartphones, personal computers, and the like. Such 3D display systems pose certain challenges, however, with respect to graphical user interfaces—i.e., how to provide the user with a graphical user interface that allows the user to easily interact with the media and/or the 3D display system itself. For example, conventional program guides are typically provided as two-dimensional images at the plane of the display unit, while the 3D content itself might appear "closer" to the viewer than the program guide, thereby partially or entirely occluding the program guide.

At the same time, consumers have expressed significant interest in "place shifting" devices that allow viewing of television or other media content at locations other than their primary television set. Placeshifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network. Such placeshifting devices typically employ graphical user interfaces for selecting and viewing media content.

It is therefore desirable to create graphical user interfaces for selecting and otherwise interacting with media sources in the context of 3D display systems and placeshifting devices. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In general, systems and methods in accordance with the subject matter described herein are configured to employ a three-dimensional (3D) display system to provide the user with a graphical user interface (GUI), such as a program guide, that is itself a 3D image—i.e., has an apparent depth with respect to the display device.

Figure 1:
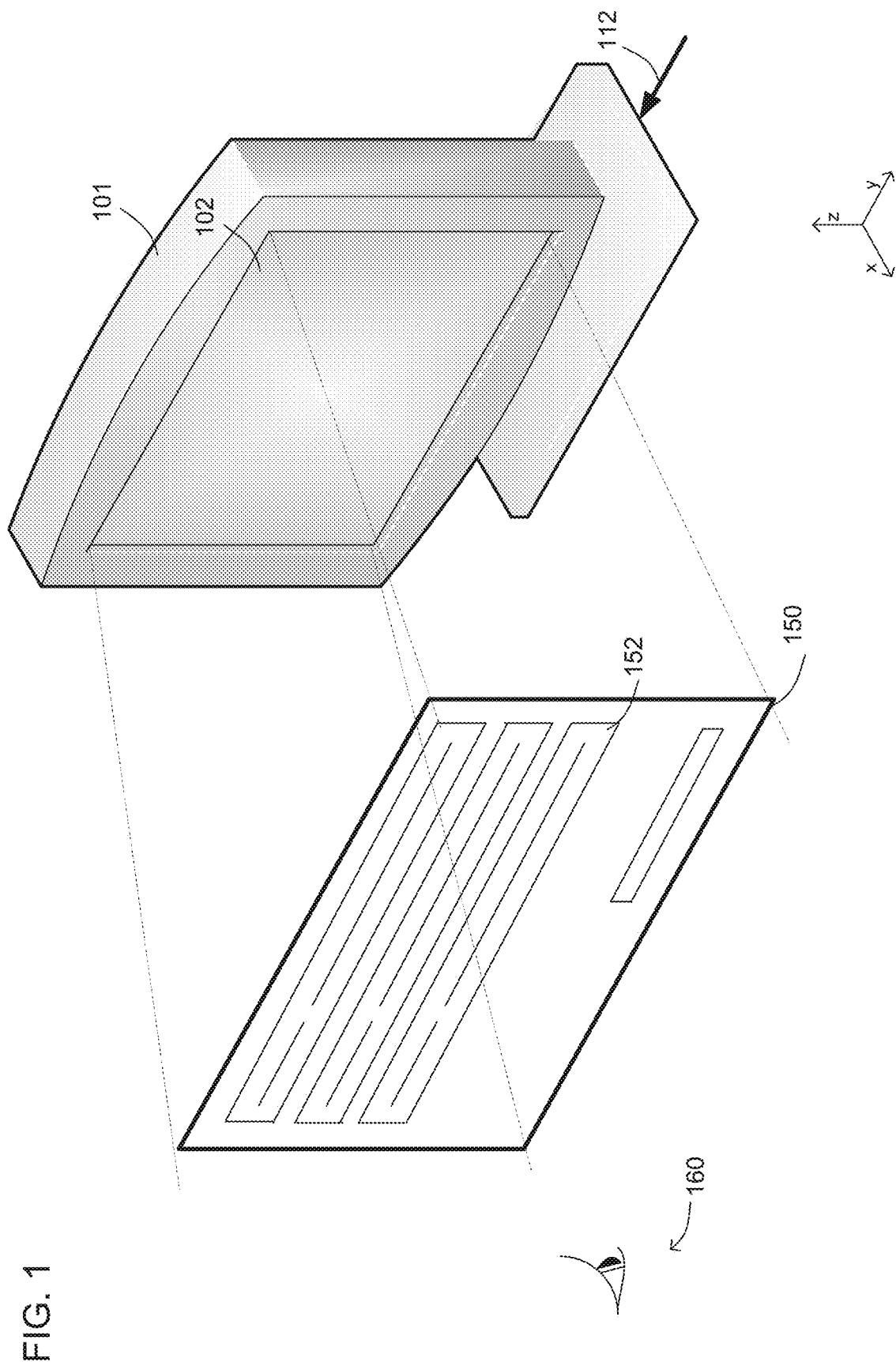
FIG. 1 is a conceptual view of a graphical user interface in accordance with one embodiment.

Referring now to FIG. 1, a user 160 is represented schematically as an eye oriented toward a display device 101, for example, a liquid crystal display (LCD), organic light-emitting diode (OLED) display, or other such display. Display device 101 composes part of a 3D display system. In some embodiments, display device 101 is communicatively coupled (e.g., via any convenient form of wired or wireless communication) to an external component (e.g., a media component, not shown) that provides a signal 112 that is processed and ultimately results in an image displayed by the 3D display system (e.g., as in "3D-ready" televisions systems). In other embodiments, the entire 3D display system may be self-contained within display device 101 itself.

The term "3D display system" is used herein to refer to any combination of hardware and software configured to produce one or more images that convey depth perception to a user. That is, from the user's point of view, one or portions of a viewed image will have an "apparent depth" with respect to a surface 102 of display device 101, i.e., extending into or out of the physical display screen (along the x-axis as defined in the drawings). Such 3D display systems may employ a variety of methods, but typically involve producing offset images that are presented separately to the left and right eyes. Such 3D displays may or may not require special glasses, depending upon the technique employed. Example 3D display systems include, without limitation, multi-view systems, active shutter 3D systems, polarized 3D systems, and autostereoscopic systems. The nature of such 3D display systems are well known in the art, and need not be discussed in detail herein.

In accordance with various embodiment of the invention, display device 101 is employed to provide user 160 with a three-dimensional GUI 150—i.e., a GUI 150 that has an apparent depth with respect to display device 101 (e.g., display device surface 102). In the example embodiment, for example, GUI 150 includes any number of conventional and well known user interface components 152 (menu items, lists, buttons, check-boxes, and the like) arranged in a plane that is substantially parallel to display device surface 102 (which for the purposes of this example is assumed to have a substantially planar front face, as illustrated). The invention is not so limited, however, as described in further detail below.

In one embodiment, GUI 150 comprises a program guide used in connection with media selection and viewing. The term "program guide" as used herein with respect to GUI 150 refers to any form of interactive display, menu, or user interface that allows a user to interactively observe and navigate scheduling information relating to content from media sources. In some embodiments, the program guide allows selecting and discovering programming by time, title, station, or genre using an input device such as a keypad, computer keyboard, remote control, gestural input (e.g., via 3D sensor devices) or the like. A typical program guide provides information covering a certain number of days, e.g., seven or fourteen days. The term "program guide" includes, but is not limited to, what are referred to by some manufacturers as "interactive program guides" and "electronic program guides."

In FIG. 1, the GUI 150 is illustrated as a lying along a plane having an apparent depth between the user 160 and the display device 101. That is, referring to the coordinate system indicated in the lower right of FIG. 1, GUI 150 is substantially parallel to the y-z plane, where the x-axis is substantially normal to the front face of display device 102. The apparent depth of GUI 150 with respect to display device 101 and the actual content image being viewed (from the point of view of user 160) may vary depending upon the embodiment.

Figure 2:
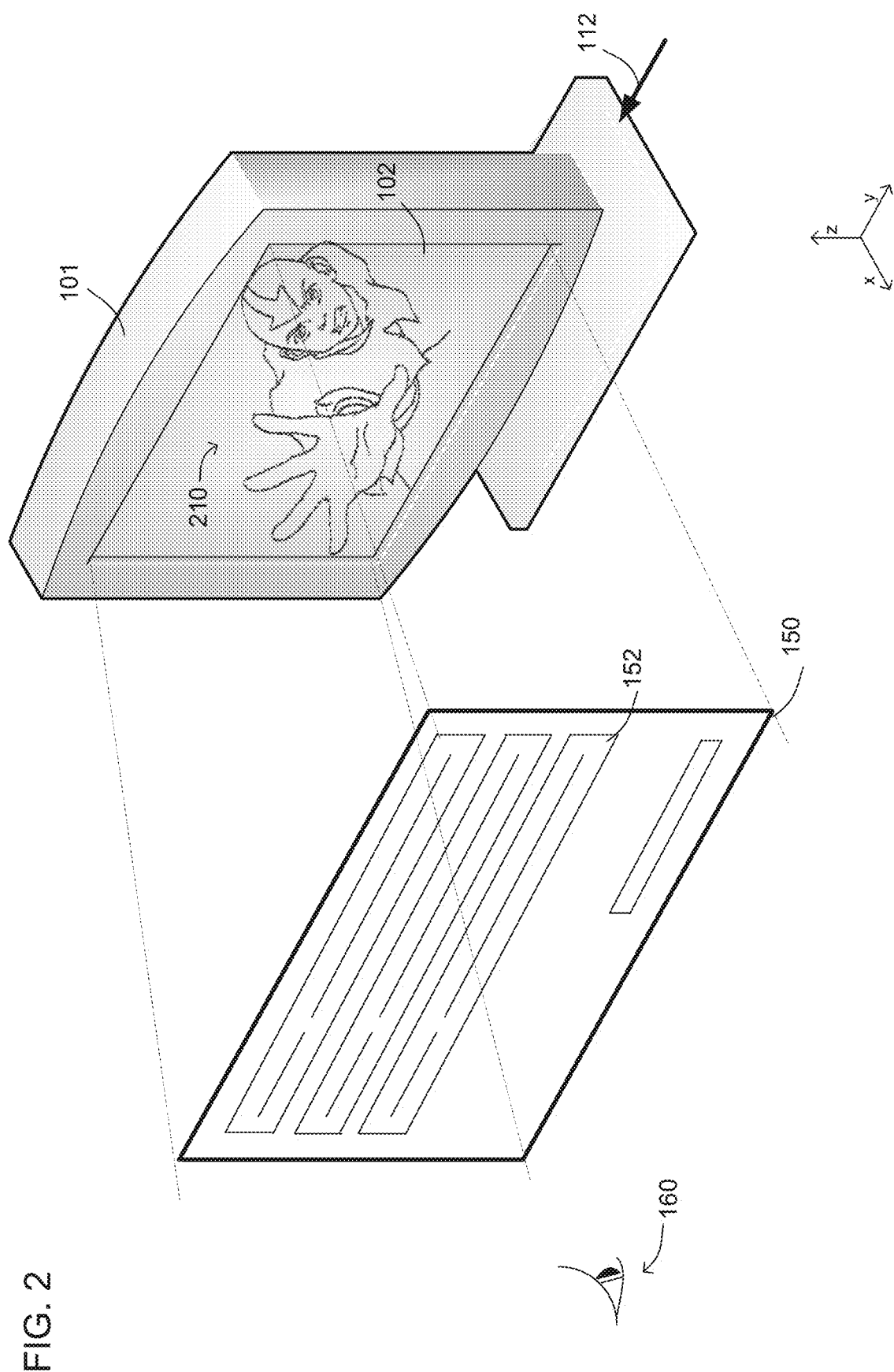
FIG. 2 is a conceptual view of a graphical user interface in accordance with one embodiment.

Referring to FIG. 2, for example, a media content image (or simply "image") 210 (i.e., the movie or other programming being viewed by user 160) may appear as a 2D image at the plane of surface 102, while GUI 150 appears as a plane in three dimensions with an apparent depth closer to user 160. In one embodiment, image 210 is initially presented as a 3D image, but is momentarily converted to a 2D image (as shown) while GUI 150 is being displayed to assist the user in interacting with GUI 150.

Figure 3:
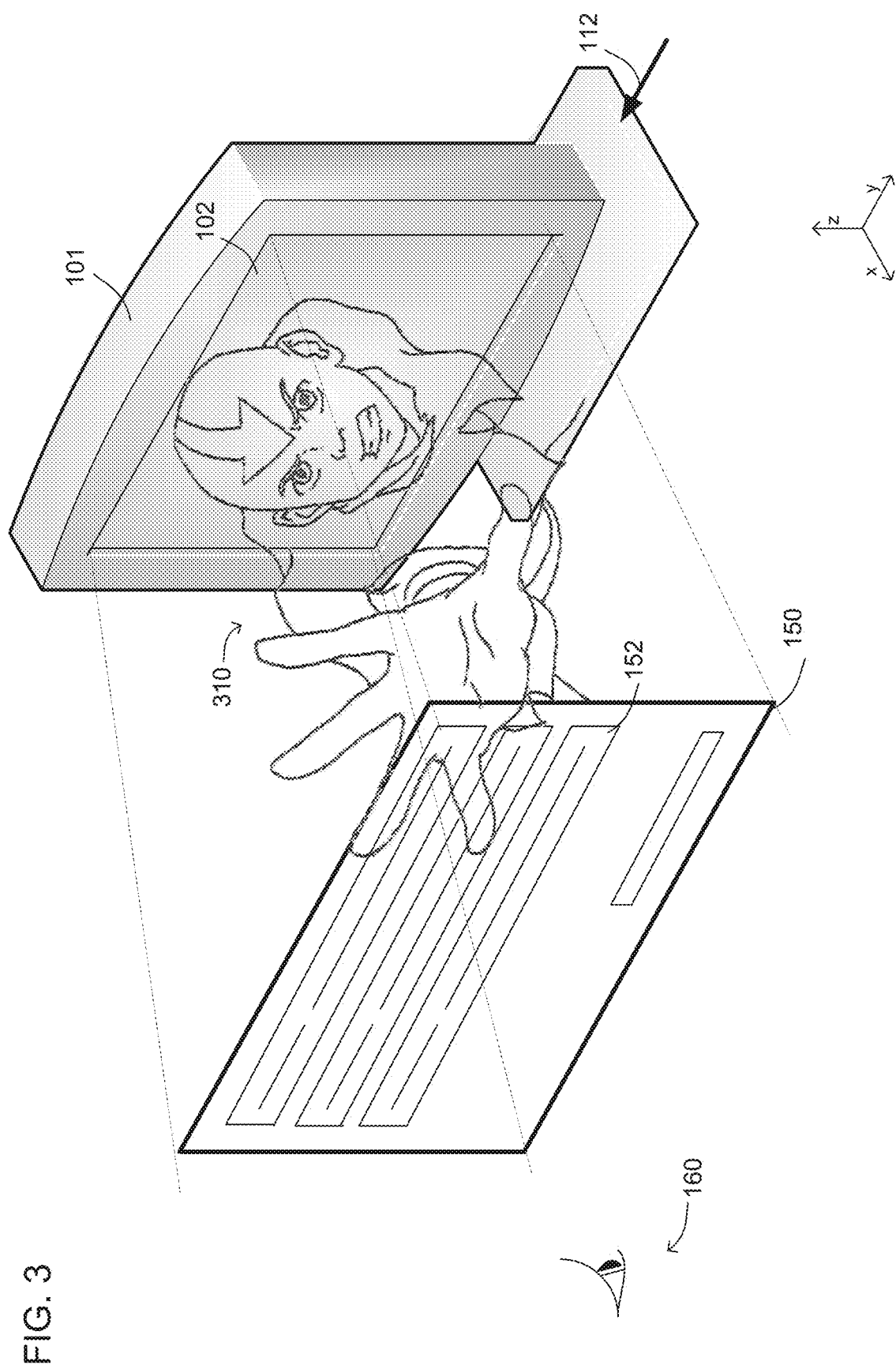
FIG. 3 is a conceptual view of a graphical user interface in accordance with one embodiment.

In one embodiment, referring now to FIG. 3, image 310 is a 3D image as shown, and GUI 150 appears as a plane in three dimensions with an apparent depth closer to user 160 than image 310. That is, the apparent distance along the x-axis from GUI 150 to surface 102 is greater than the apparent distance along the x-axis of the closest (to user 160) portion of image 310. In other embodiments, the apparent distance along the x-axis from GUI 150 to surface 102 is greater than the apparent distance along the x-axis of most of image 310, with some overlap (i.e., GUI 150 may be partially "embedded" within image 310).

Figure 4:
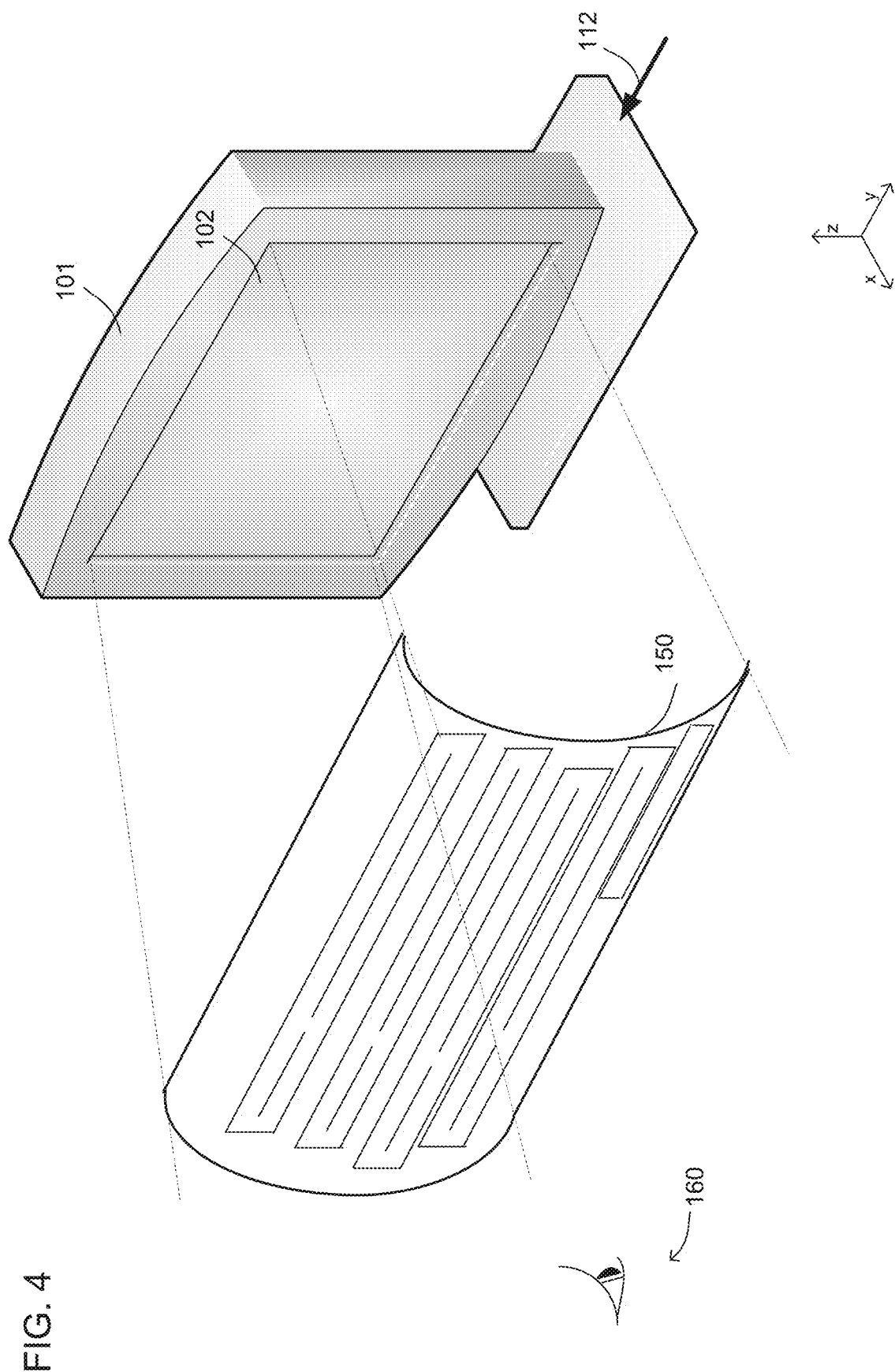
FIG. 4 is a conceptual view of a graphical user interface in accordance with one embodiment.

While GUI 150 is depicted in the above figures as a plane defined within 3D space, the invention is not so limited. Referring to FIG. 4, for example, GUI 150 may have a shape that varies in apparent depth. In the illustrated embodiment, GUI 150 is depicted as a portion of a generally cylindrical surface; however, the invention is not so limited. In some embodiments, the apparent depth of GUI 150 and its elements are static. In other embodiments, the apparent depth of GUI 150 and its elements are dynamic and may change over time—e.g., in response to input from user 160.

Figure 5:
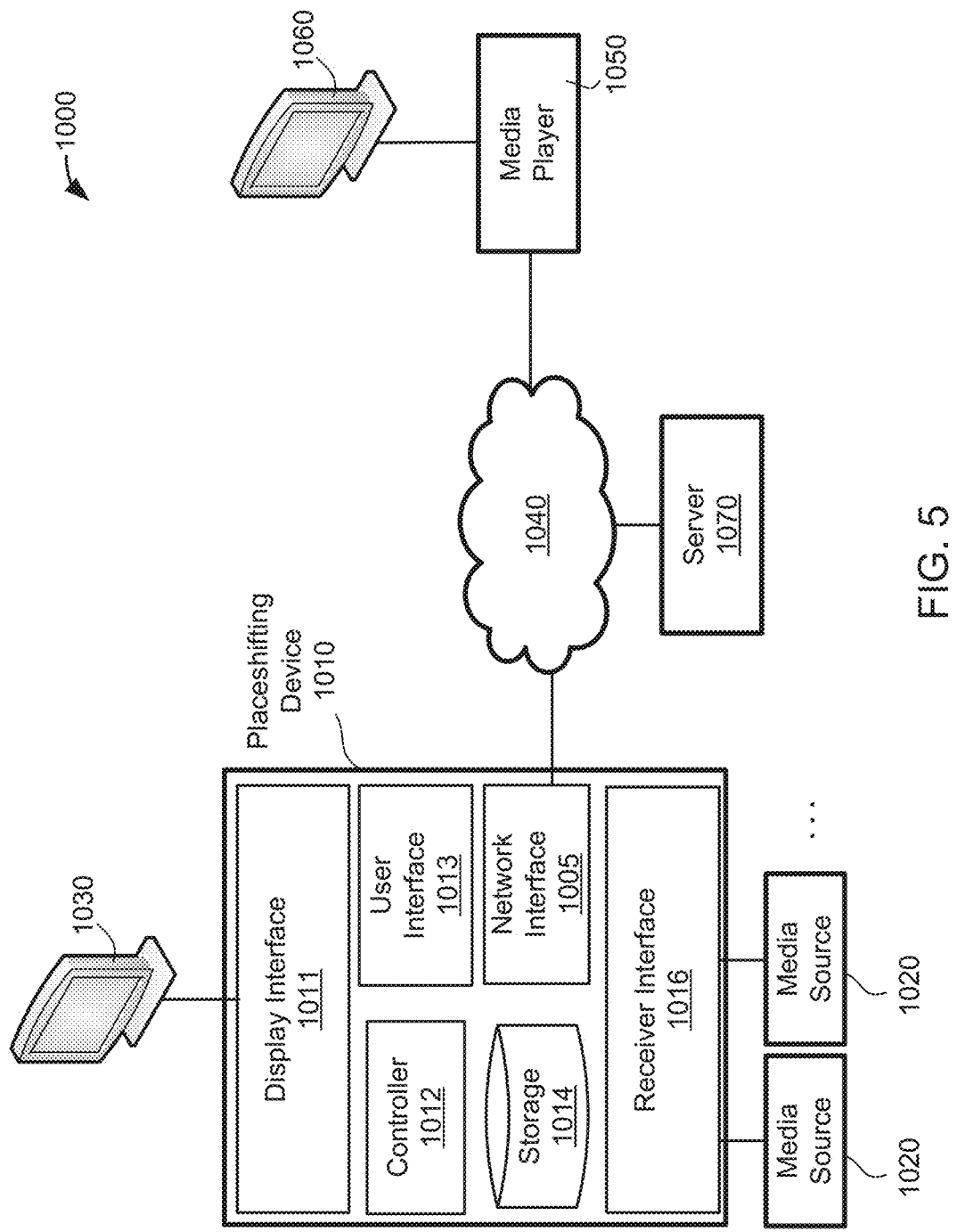
FIG. 5 is a block diagram of an exemplary placeshifting system.

The systems and methods summarized above may be implemented in conjunction with a variety of home entertainment devices and/or other media components. For example, the present invention may be implemented in the context of a placeshifting system. Referring to FIG. 5, an exemplary placeshifting system 1000 generally includes a placeshifting device 1010 that receives media content from one or more media sources 1020, encodes the received content into a suitable format (e.g., a streaming format), and then transmits the encoded media stream to a media player 1050 over a network 1040 (e.g., a WLAN, the Internet, etc.). Media player 1050 receives the encoded stream, decodes the stream, and presents the decoded content to a viewer on a television or other such display device (or "display") 1060. Similarly, the content may be viewed locally (with respect to placeshifting device 1010) via a display device 1030. In various embodiments, a server 1070 may also be provided to communicate with placeshifting device 1010 and/or media player 1050 via network 1040 to assist these devices in locating each other, maintaining security, providing or receiving content or information, and/or any other features as desired.

In connection with the present invention, display devices 1030 and/or 1060 correspond to the 3D display device 101 described above. Similarly, the signal 112 received by 3D display device 101 in FIG. 1 may correspond to a signal produced by media player 1050 or placeshifting device 1010, both of which may be classified as "media components." In general, the media component is configured to produce a signal (e.g., 112) comprising both media content and a three-dimensional graphical user interface, while the display device (e.g., 1030 or 1060) is configured to simultaneously display the three-dimensional graphical user interface and the media content image corresponding to the media content.

Media sources 1020 may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like.

Placeshifting device 1010 includes any combination of software and/or hardware configured to perform the functionality described herein. In the illustrated embodiment, for example, placeshifting device 1010 includes a display interface 1011 (coupled to display device 1030), a network interface 1015 (coupled to network 1040), and a receiver interface 1016 (coupled to media sources 1020), all of which are known in the art. Placeshifting device 1010 also includes a user interface module 1013 configured to provide interaction between the user and placeshifting device 1010 (e.g., via various menus and other conventional user interface components, such as GUI 150 described above). Placeshifting device 1010 includes a controller 1012 for coordinating the operation of other components of placeshifting device 1010, and suitable storage (e.g., hard disk and/or solid state drives) 1014 for storing data received from media sources 1020 as well as other data associated with operation of placeshifting device 1010.

It will be appreciated that placeshifting device 1010 will typically include a number of additional hardware and/or software components (e.g., memory, controllers, digital signal processors, etc.), which have been left out of the illustration in the interest of simplicity. For example, placeshifting device 1010 will typically incorporate an encoder and/or transcoder module configured to convert audio/video or other data from media sources 1020 into a packetized format that can be transmitted over network 1040. Placeshifting device 1010 may also include a transmit buffer module that temporarily stores encoded data prior to transmission over network 1040 and adjusts one or more parameters of the encoding (e.g., the bit rate of the media stream) to maintain desirable picture quality and data throughput in view of the then-current network performance. Placeshifting device may also be configured to provide commands to one or more of the media sources 1020, e.g., to request a desired input signals from that media source. Such commands may be provided over any convenient wired or wireless interface, such as an infrared or other wireless transmitter that emulates remote control commands receivable by the media source 1020. Several examples of placeshifting devices may be implemented using any of the various SLINGBOX products available from Sling Media of Foster City, Calif.

In some embodiments, placeshifting device 1010 incorporates all or a portion of the functionality typically associated with a particular media source 1020. For example, placeshifting device 1010 might be a hybrid STB or other receiver that provides transcoding and placeshifting features. Such a device may receive satellite, cable, broadcast and/or other signals that encode television programming or other content received from an antenna, modem, server and/or other source. Such devices may also include a content database (stored, for example, within storage 1014) to support a personal or digital video recorder (DVR) feature or other content library as appropriate. Stated another way, in some embodiments, media source 1020 and placeshifting device 1010 are physically and/or logically contained within a common component, housing or chassis.

In some embodiments, placeshifting device 1010 is a software application configured to be executed on a conventional computing system (e.g., a personal computer, tablet computer, smartphone, or the like). In such embodiments, placeshifting device 1010 may encode some or all of a screen display typically provided to a user of the computing system for placeshifting to media player 1050. One device capable of providing such functionality is the SlingProjector product available from Sling Media of Foster City, Calif.

Media player 1050 may be any device, component, module, hardware, software and/or the like capable of receiving a media stream placeshifting device 1010. In various embodiments, media player 1050 is a desktop computer, a laptop computer, a tablet computer, a mobile phone, a personal digital assistant, a personal media player (such as the ARCHOS products available from the Archos company of Igny, France) or the like. In many embodiments, media player 1050 is a general purpose computing device that includes a media player application that is capable of securely connecting to placeshifting device 1010 and receiving and presenting media content to the user of the device as appropriate. In other embodiments, media player 1050 is a standalone or other separate hardware device capable of receiving the media stream via network 1040 and decoding the media stream to provide an output signal that is presented on a television or other display device 1060. One example of a standalone media receiver 1050 is the SLINGCATCHER product available from Sling Media of Foster City, Calif., although other products might be used in connection with the subject matter described herein.

The particular methods described above may be implemented, for example, using software executable by controller 1012, and then presented to the user via display device 1030 and/or display device 1060.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A display system implemented with a placeshifting device that receives media content from one or more media sources displaying a graphic user interface in a plane in three dimensions with an apparent depth closer to a user, the display system comprising:

a three-dimensional graphical user interface;
a three-dimensional image that comprises a two-dimensional image of a planar front face with apparent depth to the user when presented in the three-dimensional graphical user interface;
a three-dimensional interactive program guide, the display system further comprising:
the placeshifting device is configured as a media component to produce a signal comprising: the media content received from the one or more media sources and the three-dimensional graphical user interface wherein the three-dimensional graphical user interface is combined with the three-dimensional image to display the media content from the one or more media sources in the three-dimensional image when the three-dimensional graphical user interface is displayed;
a display device communicatively coupled to the media component, the display device configured to simultaneously display the three-dimensional graphical user interface and the two-dimensional image of the planar front face of the three-dimensional image corresponding to the media content, wherein the three-dimensional graphical user interface having the apparent depth with respect to a display screen of the display device wherein the apparent depth is another depth with respect to the display device and the user's point of view extending out of a physical display screen of the display device wherein the media component comprises a media player configured to receive the signal over a network wherein the signal comprises the media content and the three-dimensional interactive program guide while the media player is configured to simultaneously display the three-dimensional graphical user interface and a media content image corresponding to the media content;
the three-dimensional graphical user interface comprises: a cylindrical surface and the three-dimensional interactive program guide wherein the three-dimensional interactive program guide is depicted as a portion of the cylindrical surface to enable the apparent depth to vary relative to the display device;
the three-dimensional graphical user interface is presented on the display device as the plane configured in three-dimensions in order for the apparent depth to appear closer to the user of the display device than the two-dimensional image of the planar front face of the three-dimensional image which is configured at a surface of the plane to appear further from the user of the display device wherein the three-dimensional graphical user interface is configured in the plane that is parallel with the display screen of the display device for an apparent display device depth with respect to a display device surface of the display device;
the three-dimensional graphical user interface is presented with an apparent distance along an x-axis from the three-dimensional graphical user interface to the surface of the plane which is greater than the apparent distance along the x-axis of a closest portion of the two-dimensional image of the planar front face of the three-dimensional image to the user preventing a partial or an entire occluding of the three-dimensional interactive program guide from the three-dimensional interface; and
the media content image is presented by the placeshifting device as the three-dimensional image when the three-dimensional interactive program guide is not displayed on the display device, and is converted to the three-dimensional image when the three-dimensional interactive program guide is displayed on the display device to assist the user in interacting with the three-dimensional interactive program guide.

2. The display system of claim 1, further comprising:
the three-dimensional interactive program guide is configured lying along the plane having the apparent depth between the user and the display device.

3. The display system of claim 1, wherein the three-dimensional graphical user interface has the apparent depth that is greater than the apparent depth of the media content image.

4. The display system of claim 1, wherein the three-dimensional graphical user interface is configured with a number of user interface components arranged in the plane that is parallel to the display device surface for presenting with the apparent display device depth with respect to the display device surface of the display device wherein the display screen of the display device has the planar front face.

5. The display system of claim 1, further comprising the placeshifting device configured to stream the media content over the network to the media component for presentation on the display device, the three-dimensional graphical user interface of a listing of the media content available for streaming transmission from the placeshifting device.

6. The display system of claim 2, wherein the three-dimensional interactive program guide is parallel to a y-z plane and wherein the x-axis is normal to a front face of the display device.

7. The display system of claim 6, wherein the apparent depth of the three-dimensional interactive program guide with respect to the display device and an actual content image viewed from a point of view of the user is variable.

8. The display system of claim 7, wherein the three-dimensional interactive program guide is depicted as the portion of the cylindrical surface with the apparent depth that extends out of the physical display screen.

9. The display system of claim 2, wherein the apparent depth of the three-dimensional interactive program guide consists of elements that are static.

10. The display system of claim 9, wherein the apparent depth of the three-dimensional interactive program guide consists of elements that are dynamic and can change over time in response to input of the user.

11. A display system for displaying a graphical user interface in a plane in three dimensions with an apparent depth closer to a user, the display system comprising:
a three-dimensional graphical user interface;
a three-dimensional image that comprises a two-dimensional planar image with apparent depth to the user when presented in the three-dimensional graphical user interface;
a three-dimensional interactive program guide, the display system further comprising:
the three-dimensional graphical user interface comprising:
a media component configured to produce a signal comprising media content and the three-dimensional interactive program guide;
a display device communicatively coupled to the media component, the display device configured to selectively display the three-dimensional interactive program guide simultaneously with a media content image corresponding to the media content;
wherein the media content image is presented as the three-dimensional image when the three-dimensional interactive program guide is not displayed on the display device and is temporarily converted to the three-dimensional image when the three-dimensional interactive program guide is displayed on the display device to assist the user in interacting with the three-dimensional interactive program guide;
wherein the media component comprises a media player configured to receive the signal over a network wherein the signal comprises the media content and the three-dimensional interactive program guide while the media player is configured to simultaneously display the three-dimensional graphical user interface and the media content image corresponding to the media content;
wherein the three-dimensional interactive program guide has the apparent depth as taken along an axis normal to a display screen of the display device wherein the apparent depth is another depth with respect to the display device and the user's point of view extending out of a physical display screen of the display device;
wherein the apparent depth of the three-dimensional interactive program guide changes in response to input received via the three-dimensional graphical user interface that is presented simultaneously with the media content image;
wherein the three-dimensional interactive program guide, when displayed, is positioned such that the three-dimensional interactive program guide overlaps with the three-dimensional image as taken along the axis normal to the display screen of the display device to partially embed the three-dimensional image within the three-dimensional interactive listing media content preventing a partial or an entire occluding of the three-dimensional interactive program guide;
wherein the three-dimensional interactive program guide, when displayed, is positioned such that an apparent distance to the three-dimensional interactive program guide is greater than the apparent distance to most of the three-dimensional image as taken along an axis;
wherein the three-dimensional graphical user interface is presented on the display device as the plane configured in three-dimensions in order for the apparent depth to appear closer to the user of the display device than the two-dimensional planar image with apparent depth of the three-dimensional image which is configured at a surface of the plane to appear further from the user of the display device wherein the three-dimensional graphical user interface has the apparent depth with respect to the display screen of the display device;
wherein the three-dimensional graphical user interface is configured in the plane in parallel with the display screen of the display device for an apparent display device depth with respect to a display device surface of the display device; and
wherein the three-dimensional graphical user interface is presented with the apparent distance along the axis from the three-dimensional graphical user interface to the surface of the plane which is greater than the apparent distance along the axis of a closest portion of the two-dimensional planar image with apparent depth of the three-dimensional image to the user preventing the partial or the entire occluding of the three-dimensional interactive program guide from the three-dimensional graphical user interface.

12. The three-dimensional graphical user interface of claim 11, further comprising a placeshifting device configured to stream the media content over the network to the media component for presentation on the display device, the three-dimensional interactive program guide listing media content available for streaming transmission from the place-shifting device.

13. The three-dimensional graphical user interface of claim 11, wherein the three-dimensional graphical user interface is configured with a number of user interface components arranged in the plane that is parallel to the display device surface for presenting with the apparent display device depth with respect to the display device surface of the display device wherein the display screen of the display device has a planar front face.

14. The three-dimensional graphical user interface of claim 13, wherein the apparent depth of the three-dimensional interactive program guide consists of elements that are static.

15. The three-dimensional graphical user interface of claim 14, wherein the apparent depth of the three-dimensional interactive program guide consists of elements that are dynamic and can change over time in response to input of the user.

\* \* \* \* \*